US006907266B2

(12) United States Patent
Muehlberger

(10) Patent No.: US 6,907,266 B2
(45) Date of Patent: Jun. 14, 2005

(54) MOBILE COMMUNICATION APPARATUS HAVING AN ACCESSORY UNIT INCLUDING AT LEAST THE TRANSPONDER CIRCUIT OF A TRANSPONDER UNIT

(75) Inventor: Andreas Muehlberger, Graz (AT)

(73) Assignee: Koninklijke Philips Electronics N.V., Eindhoven (NL)

( * ) Notice: Subject to any disclaimer, the term of this patent is extended or adjusted under 35 U.S.C. 154(b) by 434 days.

(21) Appl. No.: 10/204,021

(22) PCT Filed: Dec. 17, 2001

(86) PCT No.: PCT/IB01/02590
§ 371 (c)(1),
(2), (4) Date: Aug. 15, 2002

(87) PCT Pub. No.: WO02/51183
PCT Pub. Date: Jun. 27, 2002

(65) Prior Publication Data
US 2003/0003958 A1 Jan. 2, 2003

(30) Foreign Application Priority Data
Dec. 20, 2000 (EP) .............................. 00890382

(51) Int. Cl.[7] .............................. H04B 1/38; G06K 5/00; G06K 7/01
(52) U.S. Cl. ...................... 455/558; 455/557; 455/129; 455/74.1; 455/82; 235/380; 235/382.5
(58) Field of Search ................................. 455/558, 557, 455/129, 74.1, 82; 235/380, 382.5

(56) References Cited

U.S. PATENT DOCUMENTS

| RE36,769 E | * | 7/2000 | Ozawa et al. ............... 235/380 |
| 6,594,506 B1 | * | 7/2003 | Vapaakoski et al. ......... 455/557 |
| 6,603,982 B1 | * | 8/2003 | Muller ....................... 455/558 |
| 6,684,084 B1 | * | 1/2004 | Phillips ...................... 455/558 |
| 2002/0065106 A1 | * | 5/2002 | Bishop et al. .............. 455/558 |

FOREIGN PATENT DOCUMENTS

WO  WO9941714  8/1999  ............. G07F/7/10

* cited by examiner

Primary Examiner—Lester G. Kincaid
Assistant Examiner—Khai Nguyen
(74) Attorney, Agent, or Firm—Kevin Simons

(57) ABSTRACT

A mobile communication apparatus (1) includes a transponder unit (15) having transmission means (16) and a transponder circuit (17) and is adapted to accommodate an accessory unit (ESIM), the accessory unit (ESIM) being provided with at least the transponder circuit (17) of the transponder unit (15).

12 Claims, 2 Drawing Sheets

MOBILE COMMUNICATION APPARATUS HAVING AN ACCESSORY UNIT INCLUDING AT LEAST THE TRANSPONDER CIRCUIT OF A TRANSPONDER UNIT

The invention relates to a mobile communication apparatus which is adapted to communicate via an at least partly wireless communication link and which includes a transponder unit.

The invention further relates to an accessory unit for a mobile communication apparatus, which accessory unit includes accessory means for the mobile communication apparatus.

A mobile communication apparatus of the type defined in the first paragraph is known, for example, from the patent document WO 99/41714 A1. In the known mobile communication apparatus, which takes the form of a mobile telephone, the transponder unit is formed by a card accommodated in a card holder inside the communication apparatus, which requires the provision of separate means, i.e. the card holder, for holding the card. The known mobile telephone is adapted to accommodate at least one accessory unit in a manner known per se, although this is not referred to explicitly in the aforementioned patent document. However, is commonly practice for mobile telephone manufacturers to put such a mobile telephone onto the market without the mobile telephone including a subscriber identity module (SIM), which is an accessory unit required for the correct operation of the mobile telephone. Such a subscriber identity module is available from a mobile-telephone network provider and should be mounted as an accessory unit into a mobile telephone sold by a mobile telephone manufacturer. Such a subscriber identity module includes a memory as an accessory means for the mobile telephone, which memory can store the data representing the subscriber identity as well as further data. Furthermore, such a mobile telephone also has a battery pack, which battery pack also forms an accessory unit, which includes at least one rechargeable battery as an accessory means.

It is an object of the invention to improve a mobile communication apparatus of the type defined in the first paragraph and to provide a mobile communication apparatus whose construction is simplified as compared with the known construction and whose transponder function can be set up more conveniently.

In order to achieve the aforementioned object characteristic features in accordance with the invention are provided in a mobile communication apparatus in accordance with the invention, in such a manner that the mobile communication apparatus can be characterized in the manner defined hereinafter, namely:

A mobile communication apparatus which is adapted to communicate via an at least partly wireless communication link and which includes a transponder unit which is adapted to provide contactless communication with a communication station and which has transmission means and which includes a transponder circuit, and which is adapted to accommodate an accessory unit which can be connected detachably to the mobile communication apparatus and which includes accessory means for the mobile communication apparatus, in which the accessory unit is provided with at least the transponder circuit of the transponder unit.

As a result of the provision of the measures in accordance with the invention a particularly simple and compact construction is obtained because no additional space is required to accommodate the transponder circuit of the transponder unit, use being made of the space which is required anyhow to accommodate an accessory. Owing to the measures in accordance with the invention it is further achieved that it is not necessary to separately mount a card, provided as transponder unit, into the mobile communication apparatus, as is required in the known communication apparatus, but that mounting is effected at the same time that the accessory unit is mounted, which also simplifies setting up.

In a mobile communication apparatus in accordance with the invention the transmission means may be accommodated in the mobile communication apparatus separate from the transponder circuit and the accessory unit may include at least one transmission means mating contact by means of which an electrical connection can be made with a transmission means terminal contact of the transmission means which are accommodated separately in the communication apparatus. However, it has proved to be particularly advantageous if the transmission means are accommodated in the mobile communication apparatus separate from the transponder circuit and have two transmission means terminal contacts, and the accessory unit has two transmission means mating contacts with the aid of each of which an electrically conductive connection can be made with a respective transmission means terminal contact. This guarantees a correct electrical connection with the transponder circuit of the transponder unit in the accessory unit both for capacitive transmission means and for inductive transmission means. In this respect, it has proved to be particularly advantageous when the accessory unit is formed by an extended subscriber identity module, which in contradistinction to the subscriber identity modules known to date additionally includes the transponder circuit of the transponder unit.

In a mobile communication apparatus in accordance with the invention it has also proved to be very advantageous when the accessory unit includes the entire transponder unit. This construction has the advantage that the transmission means, for example a transmission coil, need not be accommodated in the mobile communication apparatus separate from the transponder circuit, for example embedded in the housing of the mobile communication apparatus, but are arranged on the accessory unit together with the transponder circuit. In this respect, it has proved to be particularly advantageous if the accessory unit is formed by an extended battery pack provided with the transponder unit which includes the transponder circuit as well as the transmission means. In the present context, the extended battery pack has proved to be advantageous because such an extended battery pack has a comparatively large area, thus enabling transmission means having a comparatively large area to be realized. This is of particular importance in the case where the transmission means are formed by a transmission coil because the range attainable with such a transmission coil depends on the area enclosed by the transmission coil, i.e. in such manner that a larger range is attainable as the enclosed area increases.

An accessory unit in accordance with the invention includes the accessory means for the mobile communication apparatus and, in contradistinction to the known accessory units, additionally includes at least a transponder circuit of a transponder unit. Because of to this construction in accordance with the invention it is achieved in a simple manner that, when an accessory unit in accordance with the invention is placed into the mobile communication apparatus, not only the accessory means required for the correct operation of a mobile communication apparatus are placed into the mobile communication apparatus but, in addition, also at least the transponder circuit of a transponder unit, as a result of which the functionality of the mobile communication apparatus is extended with the functionality of the transponder unit with a single movement of the hand.

Advantageous variants of an accessory unit in accordance with the invention are characterized in that the accessory unit has two transmission means mating contacts which each make it possible to establish an electrically conductive connection with a transmission means terminal contact of a transmission means accommodated in a mobile communication apparatus, separate from the transponder circuit, such an accessory unit being very advantageously formed by an extended subscriber identity module, which in addition includes the transponder circuit of the transponder unit.

Further advantageous variants of an accessory unit in accordance with the invention are characterized in that the accessory unit includes the entire transponder unit, i.e. not just the transponder circuit of the transponder unit but, in addition, also the transmission means of the transponder circuit. In this respect it has proved to be particularly advantageous when the accessory unit is formed by an extended battery pack, which includes the transponder unit, in addition to the at least one battery pack.

The aforementioned aspects as well as further aspects of the invention will be apparent from the examples of embodiments described hereinafter and will be elucidated with the aid of these examples.

The invention will be described in more detail hereinafter with reference to two embodiments which are shown in the drawings by way of example but to which the invention is not limited.

Figure 1:
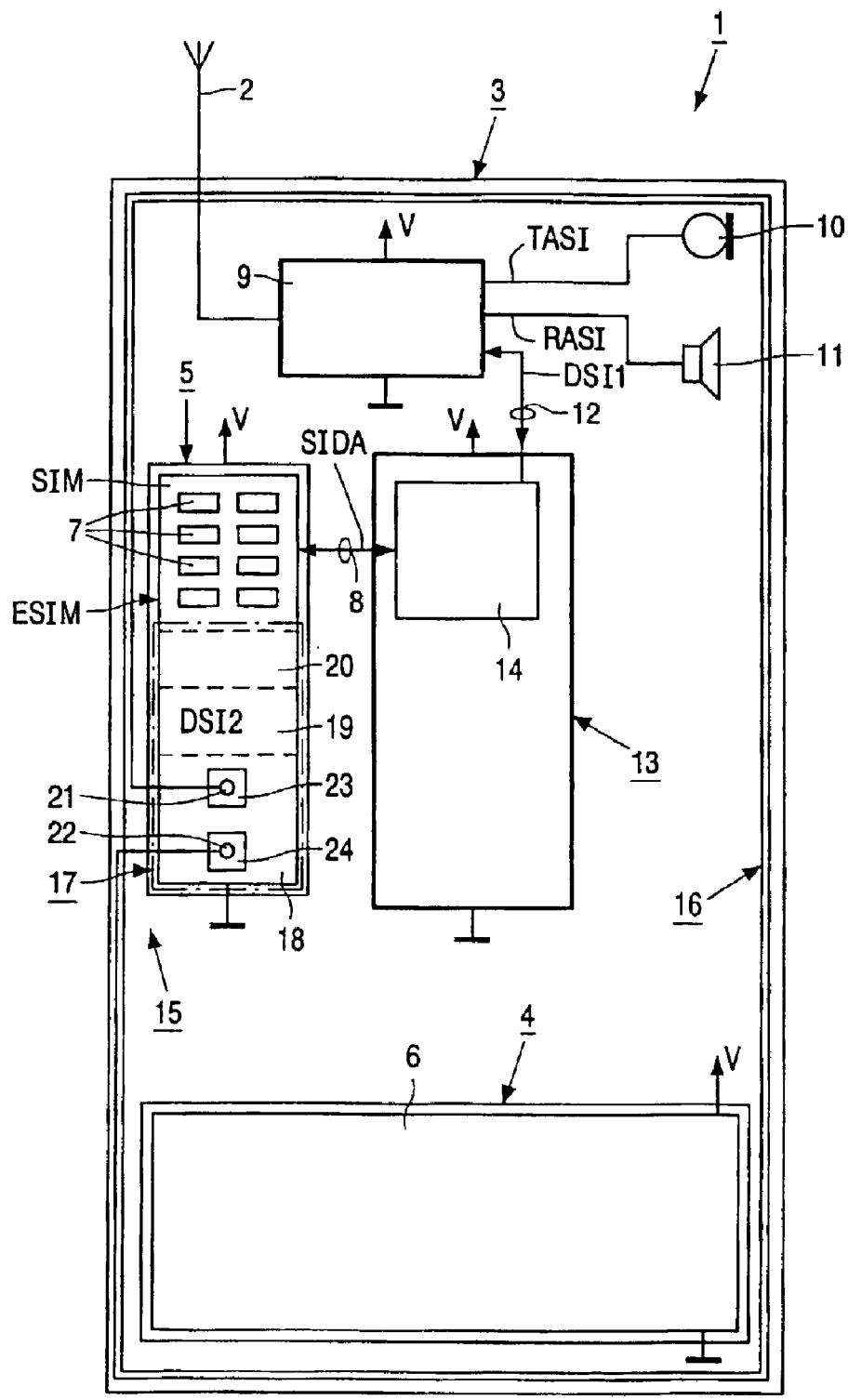
FIG. 1 is a highly schematic block diagram which shows a relevant part of a mobile communication apparatus in accordance with a first embodiment of the invention.

FIG. 1 shows a mobile communication apparatus 1, which in the present case takes the form of a so-termed mobile telephone 1. In known manner, the mobile telephone 1 is adapted to communicate via an at least partly wireless communication link. For this purpose, the mobile telephone 1 has an antenna 2, which projects from a housing 3 of the mobile telephone 1. The housing 3 of the mobile telephone 1 has a first holder compartment 4 and a second holder compartment 5. The first holder compartment 4 serves to hold a battery pack 6. The second holder compartment 5 serves to and is adapted to hold an extended subscriber identity module ESIM.

The battery pack 6 forms an accessory unit for the mobile telephone 1, which unit can be connected detachably to the mobile telephone 1 in that the battery pack 6 is placed into the first holder compartment 4. The battery pack 6 has a row of terminal contacts, not shown, which are engageable with an equal number of mating contacts which project into the first holder compartment 4 of the mobile telephone 1 so as to establish an electrically conductive connection when the battery pack 6 is placed into the first holder compartment 4. The battery pack 6 includes a given number of rechargeable batteries, which each form an accessory means for the mobile telephone 1. The rechargeable batteries serve to provide the mobile telephone 1 with electric power, the rechargeable batteries supplying a supply voltage V with respect to ground in the mobile telephone 1. The supply voltage V can be applied to all the parts of the mobile telephone 1 which require this supply voltage V.

The extended subscriber identity module ESIM, which can be placed into the second holder compartment 5, also forms an accessory unit for the mobile telephone 1. The extended subscriber identity module ESIM includes a subscriber identity module SIM, which is known per se and which has a total number of eight (8) terminal contacts 7. By means of two of these contacts 7 the supply voltage V and ground potential can be applied to the subscriber identity module SIM. Some other terminal contacts 7 are connected to connection means 8, which are shown diagrammatically and whose purpose will be described in further detail hereinafter. The subscriber identity module SIM includes a memory (not shown), which forms an accessory means for the mobile telephone and which is intended and used for the storage of subscriber identity data SIDA. In addition, the memory can store further user-related data, for example a user-related telephone list and the like.

The antenna 2 of the mobile telephone 1 is connected to a signal processing circuit 9, which serves to and is adapted to process analog signals and to process first digital signals DSI1. In a communication mode a microphone 10 converts speech uttered by the user of the mobile telephone 1 into analog signals TASI to be transmitted, which signals are subsequently processed by the signal processing circuit 9 and then applied to the antenna 2 in order to be transmitted. After their reception, signals received in such a communication mode with the aid of the antenna 2 are also processed by the signal processing circuit 9 and are subsequently applied as received analog signals RASI to a loudspeaker 11 in order to be reproduced acoustically.

First digital signals DSI1 received in a communication mode with the aid of the antenna 2 are extracted by means of the signal processing circuit 9 and are applied to a microcomputer 13 of the mobile telephone 1 via a connection means 12, shown diagrammatically. In addition to a multitude of other means and functions, the microcomputer 13 inter alia realizes processing means 14 for the first digital signals DSI1. The first processing means 14 extract subscriber identity data SIDA included in the first digital signals DSI1. The processing means 14 are connected to the memory of the subscriber identity module SIM via connection means 8 provided for this purpose. Thus, with the aid of the microcomputer 13, i.e. with the aid of the processing means 14, it is possible to apply the subscriber identity data SIDA stored in the subscriber identity module SIM to the microcomputer 13, i.e. to the processing means 14, via the connection means 8, so that subsequently the microcomputer 13, i.e. the processing means 14, can make a comparison of the subscriber identity data SIDA read from the memory of the subscriber identity module SIM with the subscriber identity data SIDA extracted from the received first digital signals DSI1, for example to enable a communication mode when the subscriber identity data SIDA this compared are identical.

The mobile telephone 1 also includes a transponder unit 15, which in known manner is adapted to provide contactless communication with a communication station which is not shown in FIG. 1. The transponder unit 15 essentially consists of transmission means 16 and of a transponder circuit 17, shown as a dash-dot line in FIG. 1. In the present case, the transmission means 16 are formed by a transmission coil 16. In a manner known per se the transponder circuit 17 includes analog signal processing means 18 and digital signal processing means 19 as well as memory means 20. The analog signal processing means 18 include a plurality of signal processing stages, not shown in FIG. 1, namely a clock signal regeneration stage and a demodulation stage and a decoding stage and a modulation stage and an encoding stage. In the present case, the digital signal processing means 19 are formed by a further microcomputer, but this is not strictly necessary because the digital signal processing means 19 may alternatively be formed by a so-called hard-wired logic circuit. The digital signal processing means 19 serve to process second digital signals DSI2. The memory means 20 serve to and are adapted to store transponder data obtained with the aid of the second digital signals DSI2 and to supply previously obtained transponder data. It is to be noted that the transponder unit 15 is adapted to provide contactless communication in accordance with the ISO 14.443 standard.

As is apparent from FIG. 1, the extended subscriber identity module ESIM provided in the mobile telephone 1 as an accessory unit for the mobile telephone 1 is provided with the transponder circuit 17 of the transponder unit 15. In an advantageous form of the extended subscriber identity module ESIM the memory of the subscriber identity module SIM and the transponder circuit 17 are realized by means of a single integrated device.

In the mobile telephone 1 the transmission coil 16 is arranged in the mobile telephone 1 separate from the transponder circuit 17. The transmission coil 16 is molded in the housing 3 of the mobile telephone 1, the transmission coil 16 having two transmission coil terminal contacts 21 and 22 as transmission means terminal contacts. In the present case, the extended subscriber identity module ESIM provided as an accessory unit has two transmission means mating contacts 23 and 24, with the aid of which an electrically conductive connection with a respective transmission coil terminal contact 21 or 22 can be made.

Thus, in the mobile telephone 1 the accessory unit is formed by the extended subscriber identity module ESIM, which includes the conventional subscriber identity module SIM and, in addition, includes the transponder circuit 17 of the transponder unit 15. It is to be noted that in the case of the mobile telephone 1 shown in FIG. 1 not only the extended subscriber identity module ESIM can be placed into the second holder compartment 5 but alternatively a conventional subscriber identity module SIM can be placed into the second holder compartment 5 because there is no difference in size between these two modules ESIM and SIM as a result of the implementation as an integrated circuit. It is obvious that if a conventional subscriber identity module SIM is placed into the mobile telephone 1 shown in FIG. 1 the transponder function will not be available.

Figure 2:
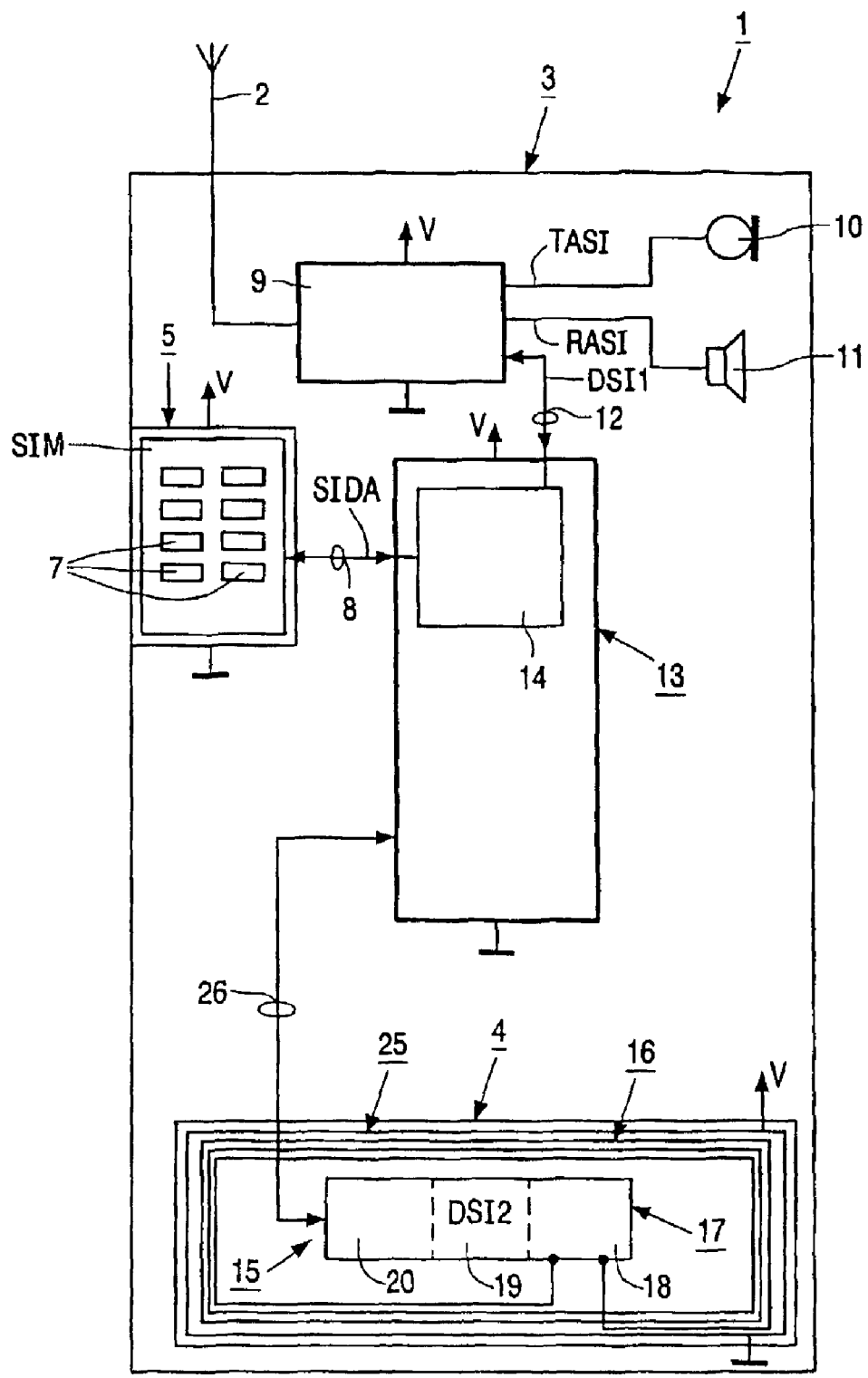
FIG. 2 shows, in a manner similar to FIG. 1, a relevant part of a mobile communication apparatus in accordance with a second embodiment of the invention.

FIG. 2 also shows a mobile telephone 1. In the mobile telephone 1 shown in FIG. 2 the second holder compartment 5 serves to and is adapted to hold a simple subscriber identity module SIM.

The first holder compartment 4 of the mobile telephone 1 shown in FIG. 2 can accommodate not only a simple battery pack (see FIG. 1), which battery pack is not shown in FIG. 2, but at option it can also accommodate an extended battery pack 25, which also forms an accessory unit for the mobile telephone 1. In the present case, the extended battery pack 25 provided as an accessory unit is provided with the entire transponder unit 15. Thus, the extended battery pack 15 includes both the transmission coil 16 and the transponder circuit 17. The extended battery pack 15 has a row of terminal contacts which are not shown and which can engage with an equal number of mating contacts, not shown, of the mobile telephone 1 so as to form an electrically conductive connection. Some of these mating contacts are connected to a bus system 26, which is shown diagrammatically in FIG. 2 and which is further connected to the microcomputer 13, thereby enabling a data exchange between the microcomputer 13 of the mobile telephone 1 and the digital signal processing means 19 and the memory means 20 of the transponder circuit 17.

With regard to transponder units 15 used in the two mobile telephones 1 described hereinbefore it is to be noted that the transponder unit 15 of the mobile telephone 1 of FIG. 1 is a so-called active transponder unit, wherein the power supply of the transponder unit 15 is provided by means of the battery pack 6 of the mobile telephone 1. Conversely, the transponder unit 15 of the mobile telephone 1 of FIG. 2 is a so-called passive transponder unit, in which the power supply is not provided by the mobile telephone 1, i.e. not by the extended battery pack 25, but in which the power supply is provided in a contactless and inductive manner by a communication station which cooperates with the transponder unit 15. This has the advantage that the transponder unit 15 also remains operable in the event of failure of the power supply of the mobile telephone 1 from the extended battery pack 25, for whatever reason.

Finally, it is to be noted that the invention is not limited to mobile telephones but can also be used advantageously in other mobile communication apparatuses, for example in a so-called pager or in a so-called personal digital assistant.

What is claimed is:

1. A mobile communication apparatus (1) which is adapted to communicate via an at least partly wireless communication link and which includes a transponder unit (15) which is adapted to provide contactless communication with a communication station and which has transmission means (16) and which includes a transponder circuit (17), and which is adapted to accommodate an accessory unit (ESIM; 15) which can be connected detachably to the mobile communication apparatus (1) and which includes accessory means for the mobile communication apparatus (1), in which the accessory unit (ESIM; 25) is provided with at least the transponder circuit (17) of the transponder unit (15).

2. A mobile communication apparatus (1) as claimed in claim 1, in which the transmission means (16) are accommodated in the mobile communication apparatus (1) separate from the transponder circuit (17) and have two transmission means terminal contacts (21, 22), and in which the accessory unit (ESIM) has two transmission means mating contacts (23, 24) with the aid of each of which an electrically conductive connection can be made with a respective transmission means terminal contact (21, 22).

3. A mobile communication apparatus (1) as claimed in claim 2, in which the accessory unit (ESIM) is formed by an extended subscriber identity module (ESIM) provided with the transponder circuit (17) of the transponder unit (15).

4. A mobile communication apparatus (1) as claimed in claim 1, in which the accessory unit (25) is provided with the entire transponder unit (15).

5. A mobile communication apparatus (1) as claimed in claim 4, in which the accessory unit (25) is formed by an extended battery pack (25) provided with the transponder unit (15).

6. A mobile communication apparatus (1) as claimed in claim 1, in which the transponder unit (15) is adapted to provide contactless communication in accordance with the ISO 14.443 standard.

7. An accessory unit (ESIM; 25) for a mobile communication apparatus (1), which accessory unit (ESIM; 25) includes accessory means for the mobile communication apparatus (1) and is provided with at least a transponder circuit (17) of a transponder unit (15).

8. An accessory unit (ESIM) as claimed in claim 7, in which the accessory unit (ESIM) has two transmission means mating contacts (23, 24) with the aid of each of which an electrically conductive connection can be made with a respective transmission means terminal contact (21, 22) of a transmission means (16) of the transponder unit (15).

9. An accessory unit (ESIM) as claimed in claim 8, in which the accessory unit (ESIM) is formed by an extended subscriber identity module (ESIM) provided with the transponder circuit (17) of the transponder unit (15).

10. An accessory unit (25) as claimed in claim 7, in which the accessory unit (25) is provided with the entire transponder unit (15).

11. An accessory unit (25) as claimed in claim 10, in which the accessory unit (25) is formed by an extended battery pack (25) provided with the transponder unit (15).

12. An accessory unit (25) as claimed in claim 7, in which the transponder circuit (17) is adapted to provide contactless communication in accordance with the ISO 14.443 standard.

* * * * *